Figure 1:
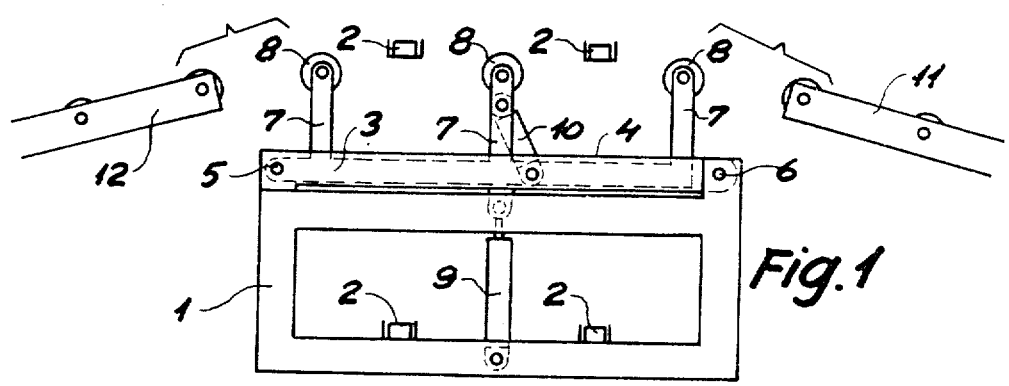

United States Patent [19]

Sølund

[11] Patent Number: 4,555,010
[45] Date of Patent: Nov. 26, 1985

[54] JUNCTION DIVERTER FOR A TRANSPORT SYSTEM

[75] Inventor: Jørgen Sølund, Haslev, Denmark

[73] Assignee: ITS-Intern Transport System A/S, Haslev, Denmark

[21] Appl. No.: 566,137

[22] PCT Filed: Apr. 15, 1983

[86] PCT No.: PCT/DK83/00044
§ 371 Date: Dec. 13, 1983
§ 102(e) Date: Dec. 13, 1983

[87] PCT Pub. No.: WO83/03592
PCT Pub. Date: Oct. 27, 1983

[30] Foreign Application Priority Data

Apr. 16, 1982 [DK] Denmark ............... 1707/82

[51] Int. Cl.[4] .............................. B65G 47/57
[52] U.S. Cl. ...................... 198/361; 193/36; 198/365; 198/367; 198/598
[58] Field of Search ............ 198/360, 361, 365, 367, 198/370, 372, 598, 721, 441; 193/36; 414/748

[56] References Cited

U.S. PATENT DOCUMENTS 1,933,147 10/1933 Paxton ............... 198/361 X
3,058,570 10/1962 Hansen ............... 198/441
3,642,113 2/1972 Burgis ............... 198/372
3,822,777 7/1974 Jepson ............... 198/721 X

FOREIGN PATENT DOCUMENTS 0569101 7/1958 Belgium ............... 198/365

Primary Examiner—Joseph E. Valenza
Assistant Examiner—Lyle Kim
Attorney, Agent, or Firm—Karl W. Flocks; Sheridan Neimark; A. Fred Starobin

[57] ABSTRACT

A junction diverter with a supporting surface disposed below a main conveyor path when in an inoperative position can be lifted above the main conveyor path to an inclined position in which it is flush with one or the other of a pair of lateral conveyor paths. The supporting surface consists of wheels or rollers extending upward from an inner carrier frame which at one end is pivotally connected to an outer carrier frame which at its opposite end from its connection to the inner frame is pivotally connected to a main support frame of the main conveyor path, with a jack connected to raise the outer frame from the main support frame and a second jack to raise the inner frame from the outer frame, thus tilting the supporting surface toward one or the other of the lateral conveyor paths.

8 Claims, 3 Drawing Figures

JUNCTION DIVERTER FOR A TRANSPORT SYSTEM

The invention relates to a junction diverter for a transport system having a main conveyor path extending through or terminating at the junction, and a pair of lateral conveyor paths extending obliquely downwards from the junction at their respective sides of the main conveyor paths.

At the junction where a main conveyor path, which is e.g. a sorting conveyor in a parcel sorting system, meets a pair of lateral conveyor paths disposed opposite each other at either side of the main conveyor path, parcels are to be diverted to a desired one of these two lateral conveyor paths.

The Danish Patent Application No. 1538/77 discloses a conveyor having laterally tiltable carrier plates or trays capable of performing this task. The proposed solution, however, has resulted in a rather complicated conveyor because these tiltable carrier plates are incorporated in the entire main conveyor path, which consists of a very large number of adjoining carrier plates each of which has its own tilting mechanisms.

The Swedish Patent Specification No. 331 963 discloses a junction diverter containing, in the direction of the main conveyor path, an intermediate conveyor belt which has to be lowered when the parcels are to be diverted to one or the other lateral conveyor paths. This intermediate conveyor belt means that the main conveyor path is always interrupted and reduces the capacity of the overall system. Moreover, the intermediate conveyor belt causes the system to be relatively expensive to manufacture.

The Danish Patent Specification No. 121 288 discloses a transport system having a junction diverter which only diverts the parcels to one side. Consequently, the transport system in question requires another junction diverter if the parcels are to be diverted to the other side, and will therefore take up excessive space.

From U.S. Pat. No. 3,058,570 of Hansen a junction diverter for a transport system is known having a main conveyor path extending through or terminating at the junction. There is furthermore provided a pair of lateral conveyor paths extending obliquely downwards from the junction at their respective sides of the main conveyor path, the junction comprising means providing a movable supporting surface which, in an inoperative position, is disposed below the main conveyor path and can, in an operative position, be lifted above the main conveyor path to an inclined position in which it is flush with one or the other of the lateral conveyor paths.

This known junction diverter, however, comprises also basically the same drawbacks as the prior art described hereinbefore.

It is therefore the object of the invention is to solve the present problem far more simply without the drawbacks of the said known systems.

Accordingly, the invention provides a junction diverter for a transport system having a main conveyor path extending through or terminating at the junction, and a pair of lateral conveyor paths extending obliquely downwards from the junction at their respective sides of the main conveyor paths, the junction comprising means providing a supporting surface which in an inoperative position is disposed below the main conveyor path and can in an operative position be lifted above the main conveyor path to an inclined position in which it is flush with one or the other of the lateral conveyor paths, wherein the means are secured to and extend upwardly from a first carrier frame which is journalled on a second carrier frame for pivotal movement about a first axis disposed substantially in parallel with the main conveyor path and at one side of the center thereof, and that the second carrier frame is journalled on a frame for the main conveyor path for pivotal movement about a second axis disposed substantially in parallel with a main conveyor path and at the other side of the center thereof. Thus, the means providing the supporting surfacing, which can be inclined to one or the other side with respect to the main conveyor path, and the supporting surface itself are only necessary at the junction itself, while the main conveyor path can consist of a generally known conveyor.

The invention will be described below the reference to the drawing, in which

Figure 2:
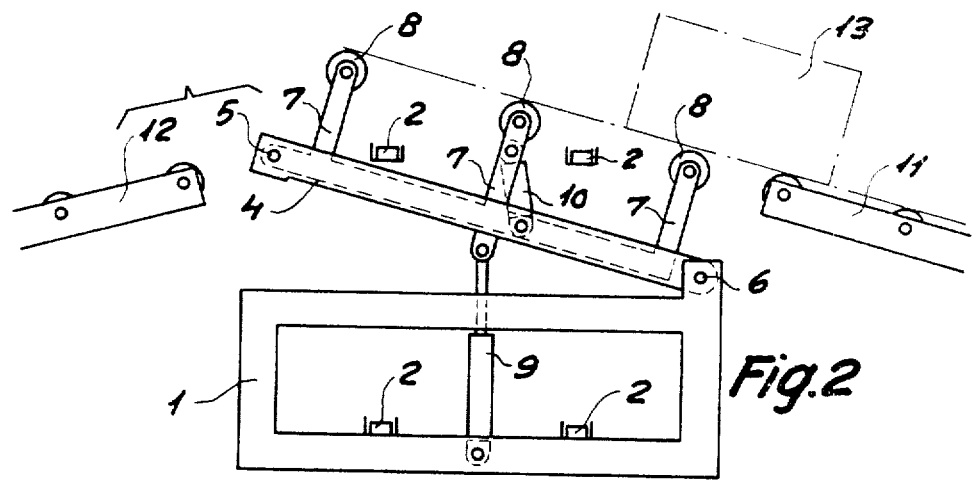
Figure 3:
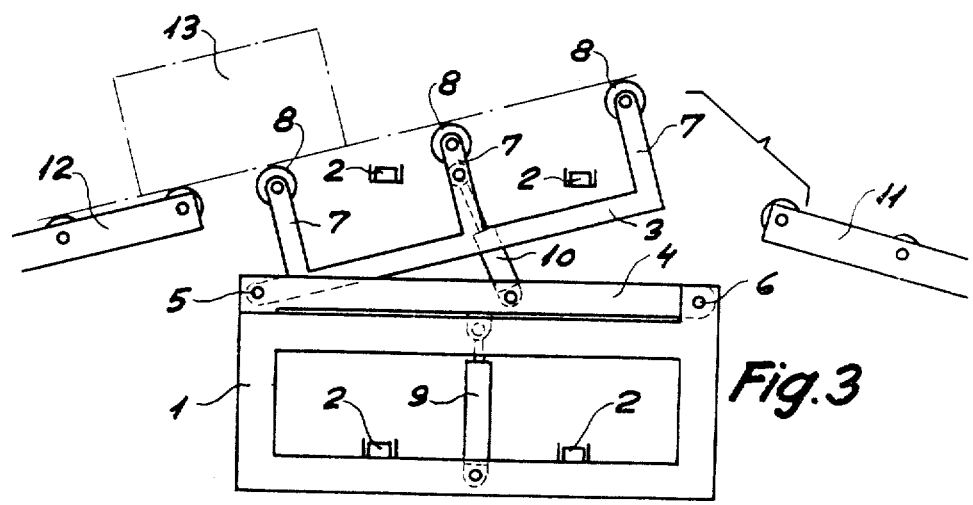

FIG. 1 is a cross-section of a junction diverter according to the invention in an inoperative position and of a main conveyor path as well as a longitudinal section of two lateral conveyor paths meeting at the junction, FIG. 2 shows the same as FIG. 1, but with the junction diverter in a first operative position where a parcel is transferred from the main conveyor path to the right-hand lateral conveyor path, and FIG. 3 shows the same as FIG. 1, but with the junction diverter in a second operative position where a parcel is transferred from the main conveyor path to the left-hand lateral conveyor path.

The drawing shows a support 1 for a main conveyor path 2, which may e.g. be a sorting conveyor in a parcel sorting system. The main conveyor 2 may e.g. be a chain conveyor, belt conveyor, band conveyor or a roller conveyor, which at the ends is passed around chain wheels, rollers or drums, so as to constitute an endless conveyor belt whose inactive path is taken back into the support 1.

A rectangular inner frame 3 is pivotally connected to a rectangular outer frame 4 at a bearing 5 along its left-hand side which is parallel with the conveyor path 2. Also the axis of rotation of the bearing 5 is parallel with the conveyor path 2.

At its side opposite the bearing 5 the outer frame 4 is pivotally connected to the support 1 of the main conveyor path 2 by means of a bearing 6, which is disposed at the right-hand side of the frame 1 and has its axis in parallel with the conveyor path 2.

The inner frame 3 mounts six upwardly extending posts 7 at each corner and in the centre of each of the sides perpendicular to the conveyor path 2, respectively; these posts 7 are connected in pairs to idle rollers 8 which, as shown, run in parallel with the main conveyor path 2.

A hydraulic jack is coupled between the main conveyor path 2 and the outer frame 4, and another jack 10 is coupled between the outer frame 4 and the inner frame 3.

To the right of the shown junction diverter there is disposed a lateral conveyor path 11, and a second lateral conveyor path 12 is provided to the left of the junction diverter.

When, as shown in FIG. 1, the junction diverter is not operative, parcels on the main conveyor path 2 just pass the junction diverter.

However, when a parcel 13 is to be delivered to the right-hand lateral conveyor path 11, the outer frame 4 as well as the inner frame 3 are activated as both frames are pivoted together about bearings 6 until they assume the position shown in FIG. 2, in which the supporting surface provided by the rollers 8 is inclined so as to be flush with the lateral conveyor path 11. This causes the parcel 13 to slide on to the lateral conveyor path 11 by gravity.

If, instead, the parcel 13 is to be delivered to the left-hand lateral conveyor path 12, the jack 10 is activated, causing just the inner frame 3 to be lifted and pivoted about the bearing 5 until it assumes the inclined position shown in FIG. 3, in which the supporting surface provided by the rollers 8 is flush with the lateral conveyor path 12.

It is clear that the jacks 9 and 10 in FIG. 2 and FIG. 3, respectively, have to be activated at the right time, i.e. precisely when the parcel 13 is disposed on the rollers 8.

Instead of the rollers 8, an air cushion might be incorporated to provide the supporting surface for the parcels.

I claim:

1. A junction diverter for a transport system having a main conveyor path (2) extending through or terminating at the junction, and a pair of lateral conveyor paths (11,12) extending obliquely downwards from the junction at their respective sides of the main conveyor path (2), the junction diverter comprising means (8) providing a movable supporting surface which, in an inoperative position, is disposed below the main conveyor path (2), and in an operative position, is lifted above the main conveyor path (2) to an inclined position in which it is flush with one or the other of the lateral conveyor path (11,12), characterized in that said means (8) providing a movable supporting surface are secured to and extend upwardly from a first carrier frame (3), which is journalled on a second carrier frame (4) for pivotal movement about a first axis (5) disposed substantially in parallel with the main conveyor path (2) and at one side of the center thereof, and that said second carrier frame (4) is journalled on a frame (1) for the main conveyor path (2) for pivotal movement about a second axis (6) disposed substantially in parallel with the main conveyor path (2) and at the other side of the center thereof.

2. The junction diverter according to claim 1, further characterized in that a first jack is coupled between said frame (1) for the main conveyor path (2) and said second carrier frame (4), and a second jack (10) is coupled between said second carrier frame (4) and said first carrier frame (3).

3. The junction diverter according to claim 2, further characterized in that said first carrier frame is an inner frame, and said second carrier frame is an outer frame.

4. The junction diverter according to claim 1 characterized in that said means providing the supporting surface consist of parallel rollers or wheels extending in the longitudinal direction of the main conveyor path.

5. The junction diverter according to claim 2, further characterized by said first and second jacks being hydraulically driven jacks.

6. The junction diverter according to claim 2, characterized in that the means providing the supporting surface consist of parallel rollers or wheels extending in the longitudinal direction of the main conveyor path.

7. The junction diverter according to claim 3, characterized in that the means providing the supporting surface consist of parallel rollers or wheels extending in the longitudinal direction of the main conveyor path.

8. The junction diverter according to claim 2, further characterized by said first and second jacks being pneumatically driven.

* * * * *